(12) United States Patent
Beatty et al.

(10) Patent No.: US 6,467,693 B1
(45) Date of Patent: Oct. 22, 2002

(54) METHODS AND APPARATUS FOR PROVIDING IDENTIFICATION INFORMATION ABOUT A USER

(75) Inventors: Lisa M. Beatty, Kirkwood; Lila Arndt, Glendale, both of MO (US)

(73) Assignee: Constructive Concepts, Inc., Kirkwood, MO (US)

( * ) Notice: Subject to any disclaimer, the term of this patent is extended or adjusted under 35 U.S.C. 154(b) by 0 days.

(21) Appl. No.: 09/863,537

(22) Filed: May 23, 2001

(51) Int. Cl.[7] .............................................. G06K 19/06
(52) U.S. Cl. ........................ 235/494; 235/375; 283/75
(58) Field of Search ........................... 235/434, 462.01, 235/375, 381, 383; 283/75, 81, 74; 156/239, 237, 240; 40/2, 3, 14, 330, 306

(56) References Cited

U.S. PATENT DOCUMENTS

| | | | |
|---|---|---|---|
| D253,731 S | | 12/1979 | Mayfield |
| 4,254,566 A | * | 3/1981 | Haskell ............... 40/2 |
| 4,610,102 A | | 9/1986 | Hill |
| 4,863,195 A | * | 9/1989 | Capozzola ............ 283/75 |
| D331,265 S | | 11/1992 | DiBlasio |
| 5,274,933 A | * | 1/1994 | Cole et al. ............ 36/136 |
| 5,367,795 A | * | 11/1994 | Iverson et al. ........ 36/136 |
| D390,275 S | | 2/1998 | Wolff |
| 5,721,539 A | * | 2/1998 | Goetzl ............... 340/870.3 |
| D393,660 S | | 4/1998 | Gibson |
| 5,782,024 A | | 7/1998 | Pausch |
| D404,770 S | | 1/1999 | Meade et al. |
| 6,094,133 A | * | 7/2000 | Shimamura et al. ...... 340/505 |
| 2001/0049470 A1 | * | 12/2001 | Mault et al. .......... 600/300 |

FOREIGN PATENT DOCUMENTS

| | | | |
|---|---|---|---|
| JP | 407041155 A | * | 2/1995 |
| JP | 020001216480 A | * | 8/2001 |

OTHER PUBLICATIONS

Gary Kunkel; "Wood N Letters, Inc.—personalized engraved wooden products"; at URL http://members.bellatlantic.net/~jkunkel/wnl/front.html; 1 page; as of Aug. 21, 2001.

Gary Kunkel; "Wood N Letters, Inc.—Diabetes Tags"; at URL http://members.bellatlantic.net/~jkunkel/wnl/treas.html; 1 page; as of Aug. 21, 2001.

(List continued on next page.)

Primary Examiner—Thien M. Le
(74) Attorney, Agent, or Firm—Robert B. Reeser, III; Armstrong Teasdale, LLP

(57) ABSTRACT

An information tag is secured to an article worn or carried by a user and provides identification information about the user in a cost-effective and reliable manner. The tag includes a plurality of layers including a body and a protective layer. The body has a top surface and an opposing bottom surface. The protective layer includes a domed upper surface and a substantially planar lower surface that is attached to at least a portion of the body top surface. At least one opening extends through at least one of the body and the domed protective cover. The tag body bottom surface provides identification information about the user.

35 Claims, 6 Drawing Sheets

OTHER PUBLICATIONS

"childen with Diabetes—Medical Identification Products"; at URL: http://www.childrenwithdiabetes.com/d_06_700.htm; 2 of 6 pages; Last Updated: Tuesday, Aug. 21, 2001 08:20:12 AM Copyright© 1995–2001 *Diabetes123 and Children with Diabetes*.

"SOS Medical Emergency ID Jewelry—Designs" at URL http://sosid.com/styles.html; p. 1 of 2; Altercare, Inc. P.O. Box 545, Nesconset, NY 11767, USA SOS® 1999 All rights reserved.

"SOS Emergency Identification System" at URL http://www.sosid.com/SNS-info-sp.html; 1 page; Atercare, Inc. P.O. Box 545, Nesconset, NY 11767, USA SOS® 1999 All rights reserved.

Emergency ID Shoe Tags; at URL http://members.aol.com/_ht_a/faessler/IDTags.html; 4 of 5 pages;—Copyright 2000—Jack A. Faessler.

EMSTags—Online Emergency Information Databases; at URL http://www.emstags.com; 7 pages; as of Aug. 21, 2001.

"MedStat Alert—Products:ChildAlert" at URL http://www/medstatalert.com/childalert.html; 2 pages; as of Aug. 21, 2001.

Relectix Line; "Saf–T–Feet"; at URL http://www.promo-mart.com/81233/shoe.htm; 4 pages; as of Aug. 21, 2001.

"Sol–I.D."; at URL http://www.sol-id.com/what.htm; 2 pages; as of Aug. 21, 2001.

eScopes LLC; "Kid Scope Emergency Personal I.D." at URL http://www.escopes.com/kidsid.html; 3 pages; as of Aug. 21, 2001.

\* cited by examiner

100

102

108

METHODS AND APPARATUS FOR PROVIDING IDENTIFICATION INFORMATION ABOUT A USER

BACKGROUND OF THE INVENTION

This invention relates generally to identification devices, and more specifically to methods and apparatus for providing identification information about a user.

Identifying an injured or unconscious runner or a runaway child may be difficult if the person isn't carrying identification in a wallet, a pocket, or purse. In an effort to locate missing children and indeed to identify stricken runners or other athletes having no identification with them, at least some known municipalities have resorted to compiling fingerprint databases in an attempt to identify such individuals. However, compiling the fingerprint database may be a very time-consuming and costly process.

At least some known garment manufacturers produce identification devices that are worn by the user. For example, wristbands and headbands have been produced that include identification information. However, such items may be ineffective for use with children because they may be easily removed.

Other known identification devices are attached to a shoe and are not as easily removed by children. However, because the shoes may be subjected to moisture, dirt, and debris, tags attached to the shoes are also exposed to subject to wear. Furthermore, identification devices that are attached to flexible portions of a shoe or any portion of the shoe that routinely contacts the ground may be prematurely worn or inadvertently detached from the shoe.

BRIEF SUMMARY OF THE INVENTION

In an exemplary embodiment, an information tag is secured to a user and provides identification information about the user in a cost-effective and reliable manner. The tag includes a plurality of layers including a body and a protective layer. The body has a top surface and an opposing bottom surface. The protective layer includes a domed upper surface and a substantially planar lower surface that is attached to at least a portion of the body top surface. At least one opening extends through at least one of the body and the domed protective cover. The tag body bottom surface provides identification information about the user.

The tag is attached to the user using the tag opening, and is secured to, for example, a shoe such that the tag body is between the shoe and the domed protective layer. The protective layer facilitates preventing moisture, dirt, and debris from contacting the tag. Furthermore, the protective layer is durable and is resistant to fading when exposed to ultra-violet light.

When attached, the tag is selectively movable to display the tag body lower surface. More specifically, the tag is selectively movable to display the identification information about the user. As such, the identification information is not continuously exposed to the public, or to as much dirt and debris or moisture as that of the protective layer.

DETAILED DESCRIPTION OF THE INVENTION

Figure 1:
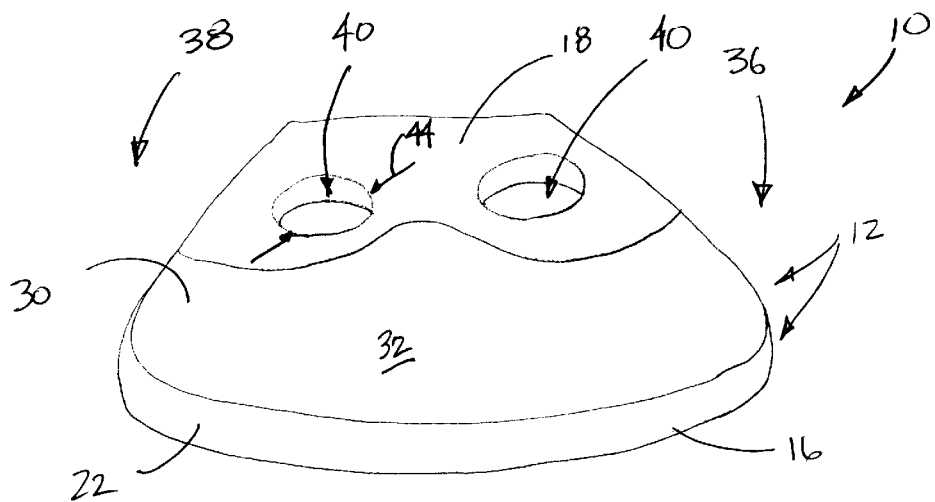
FIG. 1 is a perspective view of an exemplary embodiment of an identification tag for providing information regarding a user.
Figure 2:
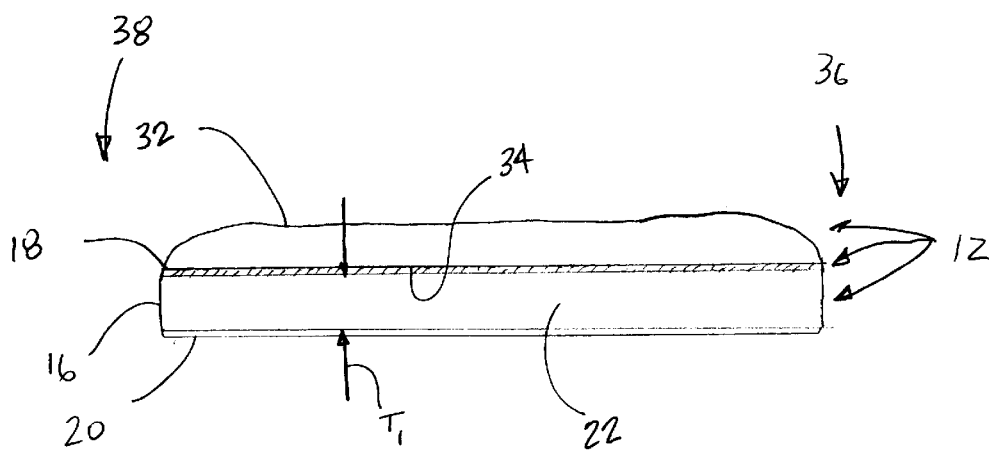
FIG. 2 is a side view of the identification tag shown in FIG. 1.

FIG. 1 is a perspective view of an exemplary embodiment of an identification tag 10 for providing identification information relevant to a user or wearer. FIG. 2 is a side view of identification tag 10. Tag 10 has a cross-sectional profile that is a pre-defined geometric shape, and includes a plurality of layers 12. More specifically, tag 10 includes a body 16 having an upper surface 18 and an opposite lower surface 20. Tag body upper and lower surfaces 18 and 20, respectively, are connected with a sidewall 22. Sidewall 22 extends continuously with surfaces 18 and 20 to define an outer perimeter of tag 10.

A protective layer 30 includes an upper surface 32 and a lower surface 34. Protective layer lower surface 34 is substantially planar and is adhesively attached to at least a portion of body upper surface 18. In an alternative embodiment, protective layer lower surface 34 extends over substantially all of body upper surface 18. Protective layer upper surface 32 is contoured. More specifically, protective layer upper surface 32 is domed, and in the exemplary embodiment, extends laterally from a right side 36 of tag 10 to a left side 38 of tag 10 across a portion of body upper surface 18. In one embodiment, protective layer 30 is a self-adhesive decal that is attached to body upper surface 18. In another embodiment, protective layer 30 is attached with an adhesive material such as, but not limited to, glue.

Tag body upper and lower surfaces 18 and 20, respectively, are each substantially planar. In the exemplary embodiment, body lower surface 18 provides identification information regarding the user or wearer. More specifically, a self-laminating sticker (not shown in FIGS. 1 and 2) is attached to body lower surface 20 and is personalized with identification information. Alternatively, body lower surface 14 is engraved to include identification information regarding the user. Such identification information may include, but is not limited to, a name of the user, an address of the user, contact information, or medication information.

In the exemplary embodiment, a plurality of openings 40 extend through tag 10 for attaching tag 10 to either an article of clothing worn by the user or an item carried by the user such as, but not limited to, a suitcase, a bookbag, or a knapsack. More specifically, in the exemplary embodiment, two openings 40 extend through a thickness $T_1$ of tag body 16. Tag body thickness $T_1$ is measured between body upper and lower surfaces 18 and 20, and in the exemplary embodiment, is substantially constant within tag body 16. In the exemplary embodiment, tag body thickness $T_1$ is approximately equal 0.0625 inches. In an alternative embodiment, tag 10 includes only one opening 40.

Each opening 40 is substantially circular and has a diameter 44. In the exemplary embodiment, opening diameter 44 is approximately equal 0.25 inches. Openings 40 enable tag 10 to be attached to a wearer (not shown in FIGS. 1 or 2). More specifically, openings 40 permit tags 10 to be attached to a wearer by a plurality of items (not shown in FIGS. 1 or 2) including, but not limited to, a shoelace, a zipper pull, a neck-chain or-necklace, and fastening devices, such as safety pins.

Figure 3:
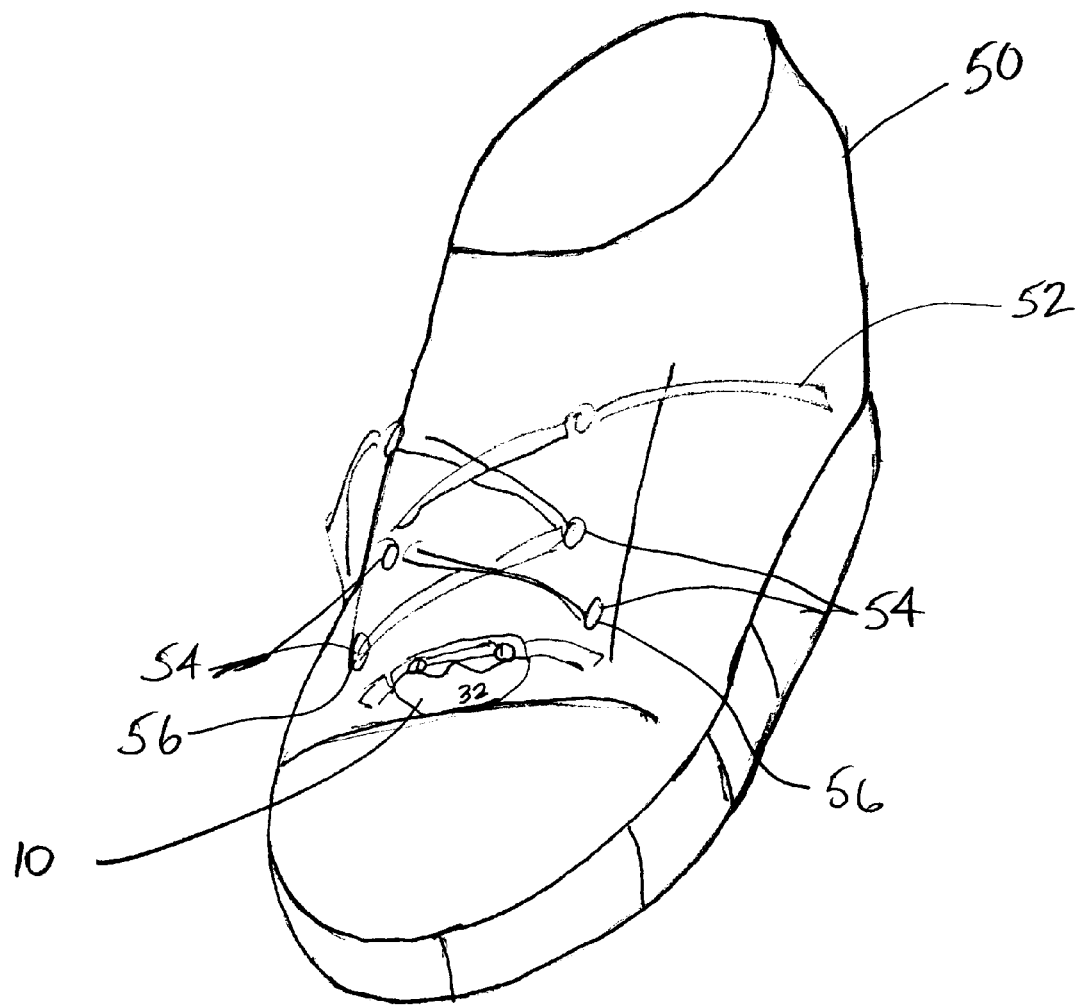
FIG. 3 is a perspective view of the identification tag attached to a shoe.

FIG. 3 is a perspective view of identification tag 10 attached to a shoe 50. More specifically, identification tag 10 is attached to shoe 50 with a shoelace 52. Shoe 50 includes a plurality of pairs of eyelets 54 that permit shoe 50 to be laced with shoelace 52. Prior to shoelace 52 being inserted through a first pair 56 of eyelets 54, shoelace 52 is extended through each tag opening 40, such that tag 10 is interlaced with shoelace 52 and is attached to shoe 50. More specifically, shoelace 52 is laced through tag 10 such that tag protective layer upper surface 32 is displayed and tag body lower surface 20 (shown in FIGS. 1 and 2) is between shoe 50 and tag protective layer upper surface 32.

Identification information is provided on, or engraved into, tag body lower surface 20 and when attached to shoe 50, tag 10 is movable relative to shoe 50. Accordingly, tag 10 may be selectively turned over to view the identification information, and as such, the identification information is not continuously displayed to the general public, but instead remains concealed. Furthermore, because the identification information is provided on tag body lower surface 20, the information is not continuously exposed to the elements, moisture, or dirt and debris that tag protective layer 30 may be exposed to. In addition, because tag 10 is interlaced to shoe 50 with shoelace 52, tag 10 may not be easily removed by children wearing tag 10.

Figure 4:
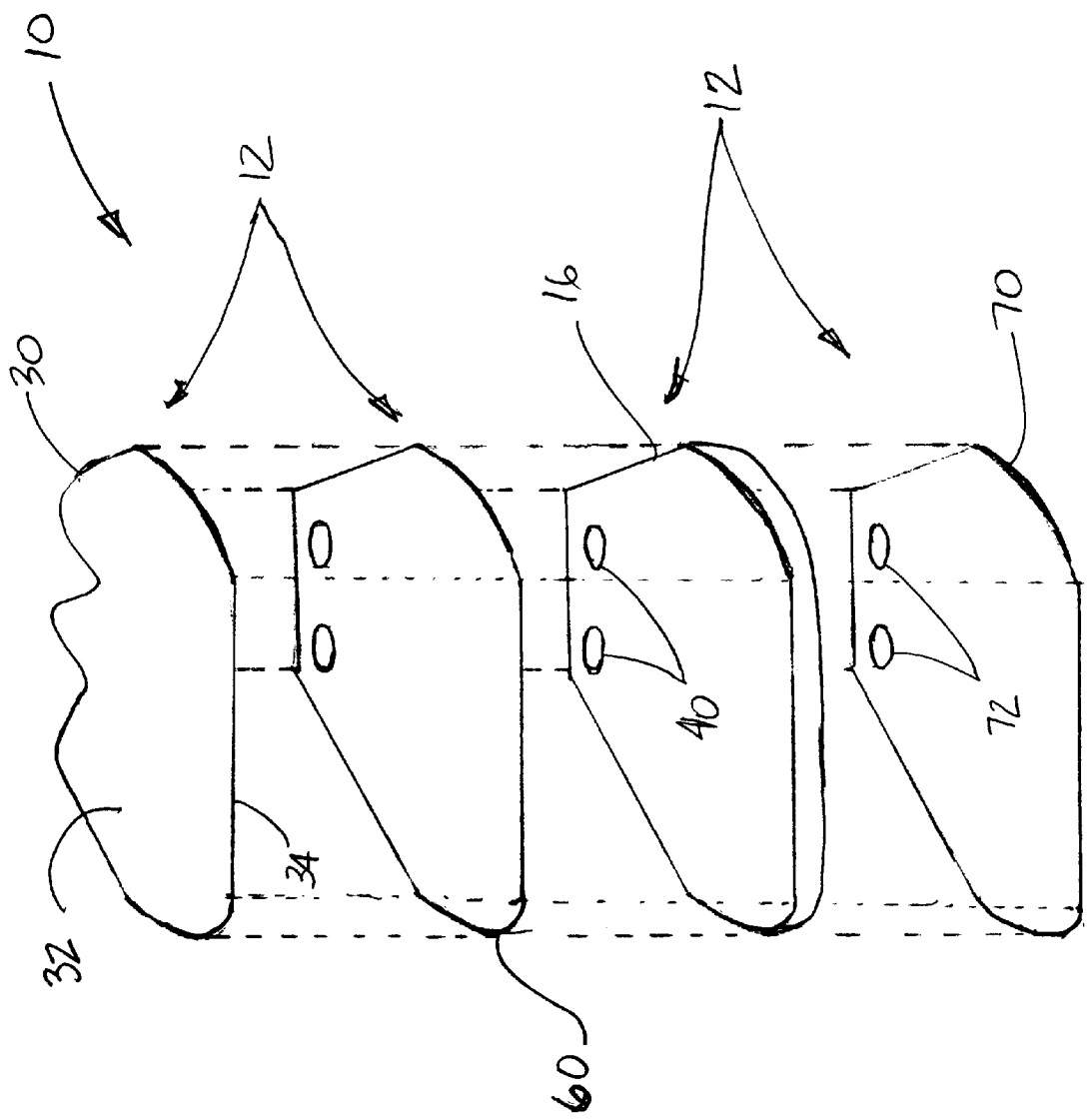
FIG. 4 is an exploded view of the identification tag shown in FIG. 1.
Figure 5:
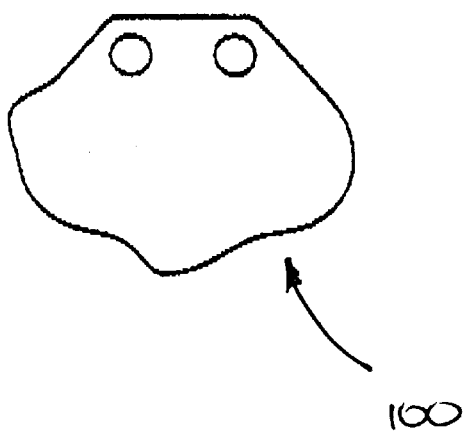
FIG. 5 is a plan view of an alternative embodiment of an identification tag.
Figure 6:
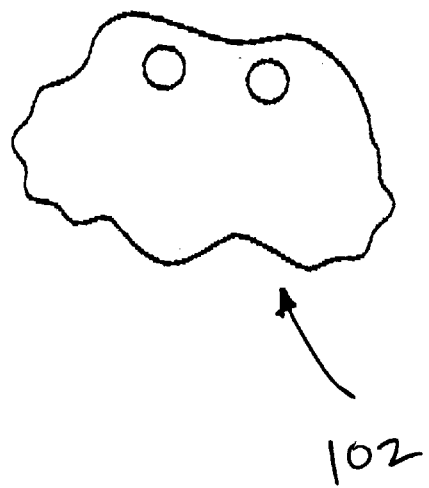
FIG. 6 is a plan view of an alternative embodiment of an identification tag.
Figure 7:
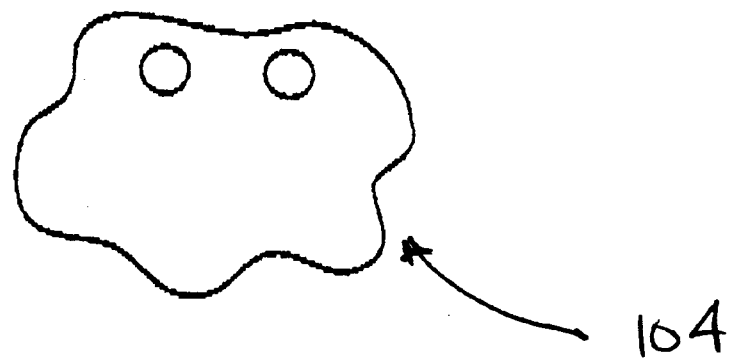
FIG. 7 is a plan view of an alternative embodiment of an identification tag.
Figure 8:
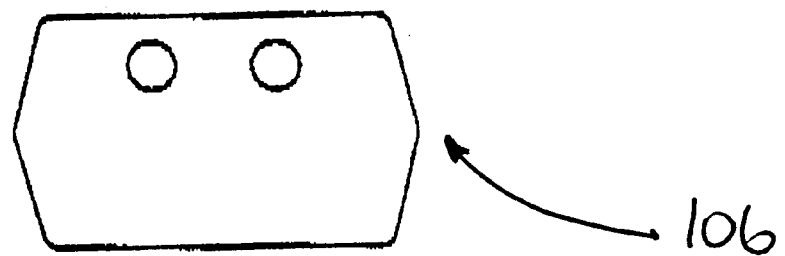
FIG. 8 is a plan view of an alternative embodiment of an identification tag.
Figure 9:
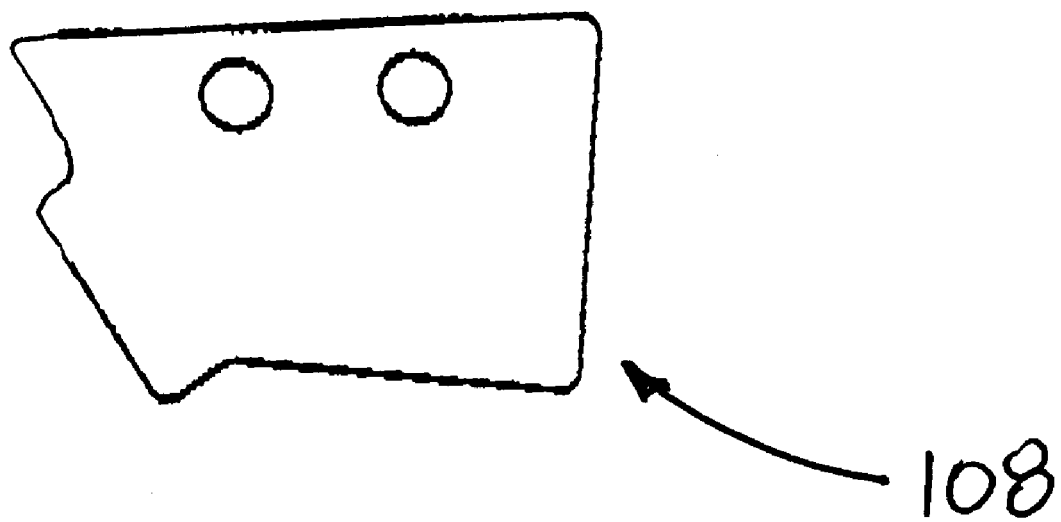
FIG. 9 is a plan view of an alternative embodiment of an identification tag.

FIG. 4 is an exploded view of identification tag 10. Tag 10 includes a plurality of layers 12. More specifically, tag 10 includes protective layer 30 and body 16. Tag protective layer 30 is fabricated from a resilient material, such that after being depressed, tag protective layer upper surface 32 returns to its original domed contour. Accordingly, tag 10 is durable, and protective layer 30 facilitates reducing wear to tag 10. In addition, the protective layer domed contour also facilitates preventing tag 10 from being inadvertently snagged on debris or other parts of shoelace 52 (shown in FIG. 3) as shoe 50 (shown in FIG. 3) is flexed during the user's activities.

Tag protective layer 30 is a protective member that also resists discoloring when exposed to ultraviolet light. In one embodiment, tag protective layer 30 is fabricated from an ABS plastic substrate commercially available from Arch Engraving, Incorporated, Kirkwood, Mo., 63122.

In the exemplary embodiment, tag protective layer 30 extends over a portion of tag body 16, and as such, openings 40 do not extend through tag protective layer 30. In an alternative embodiment, tag protective layer 30 has substantially the same cross-sectional profile as tag body 16 and extends over substantially all of tag body upper surface 18. Accordingly, in the alternative embodiment, tag protective layer 30 includes openings (not shown) that are concentrically aligned with respect to tag body openings 40.

An upper reflective layer 60 is between tag protective layer 30 and tag body 16. More specifically, upper reflective layer 60 is between tag protective layer lower surface 34 and tag body upper surface 18. In the exemplary embodiment, reflective layer 60 has substantially the same cross-sectional profile as tag body 16 and extends over substantially all of tag body upper surface 18. In one embodiment, reflective layer 60 is an M-93 material commercially available from Innovative Plastics, Incorporated, Huntington Beach, Calif. 92649.

In the exemplary embodiment, tag 10 includes a self-laminating sticker 70 attached to tag body lower surface 20. Sticker 70 has substantially the same cross-sectional profile as tag body 16, such that the lower reflective layer extends over substantially all of tag body lower surface 18. Accordingly, sticker 70 includes openings 72 that are concentrically aligned with respect to tag openings 40. Identification information is entered on sticker 70 by a user prior to attaching identification tag 10 to an item, such as shoe 50 (shown in FIG. 3). Stickers 70 are commercially available from Seton, Brandford, Conn., 06405.

In one embodiment, tag 10 does not include sticker 70, but rather a lower reflective layer (not shown) is attached to tag body 16 to reflect light. More specifically, the lower reflective layer is attached to tag body lower surface 20, and has substantially the same cross-sectional profile as tag body 16, such that the lower reflective layer extends over substantially all of tag body lower surface 18. Identification information is engraved into the lower reflective layer. In one embodiment, the lower reflective layer is available from Innovative Plastics, Incorporated, huntington Beach, Calif. 92649.

FIGS. 5–9 illustrate a plurality of alternative embodiments of identification tags 100, 102, 104, 106, and 108, respectively. Each tag 100. 102, 104, 106, and 108 is substantially identical to tag 10, but has a different cross-sectional profile. More specifically, each tag includes a sidewall that extends continuously around a tag periphery to define an outer perimeter of each tag 100, 102, 104, 106, and 108, such that each tag 100, 102, 104, 106, and 108 has a cross-sectional profile that is a pre-defined geometric shape different from that of tag 10. The tag can, of course have may other geometric shapes as well.

The above-described identification tag provides an identification means of a user in a cost-effective and reliable manner. Each tag includes a plurality of layer attached together. A protective layer is attached to at least a portion of the tag body, and has a domed contour that facilitates reducing wear of the tag. A reflective surface is also attached to the tag body between the protective layer and the tag body. The opposite side of the tag body provides identification information about the user, but the tag is attached to the user such that the identification information is not continuously displayed. As a-result, an identification information is provided about the user in a cost-effective and reliable manner. Alternatively, and rather than having identification information, the tag can be decorative only, or can contain information relating to a condition of the wearer.

While the invention has been described in terms of various specific embodiments, those skilled in the art will recognize that the invention can be practiced with modification within the spirit and scope of the claims.

What is claimed is:

1. A tag configured to be secured to a shoe, said tag comprising:
    a body having a top surface and an opposing bottom surface;
    a protective member comprising a substantially planar lower surface and a domed upper surface, said protective member lower surface attached to at least a portion of said body top surface, and
    at least one opening extending through at least one of said body and said domed protective cover.

2. A tag in accordance with claim 1 wherein said body bottom surface comprises information engraved therein.

3. A tag in accordance with claim 1 further comprising a self-laminating sticker affixed to said body bottom surface, said sticker comprising information printed thereon.

4. A tag in accordance with claim 1 wherein said body reflects light.

5. A tag in accordance with claim 1 wherein said protective member resists discoloring when exposed to ultraviolet light.

6. A tag in accordance with claim 1 wherein said protective member is a decal that extends over substantially all of said body top surface.

7. A tag in accordance with claim 1 wherein said protective member is a decal that extends over a portion of said body top surface.

8. A tag in accordance with claim 1 wherein said protective member top surface has a predetermined contour, said protective member resistant to indentations such that said top surface configured to return to the predetermined contour after being depressed.

9. A tag in accordance with claim 1 wherein said opening configured to receive a shoelace therethrough to secure said tag to the shoe.

10. A tag in accordance with claim 1 wherein said opening configured to receive a zipper pull therethrough.

11. A tag in accordance with claim 1 further comprising a plurality of openings extending through at least one of said body and said domed protective cover.

12. An information tag configured to be attached to an item worn or carried by a user, said tag comprising a body comprising at least a first layer, a second layer, and an opening extending through at least one of said first layer and said second layer, said first layer attached to at least a portion of said second layer and comprising a domed upper surface and a substantially planar lower surface, said second layer comprising an upper surface and a lower surface, said second layer upper surface adjacent said first layer lower surface, said second layer lower surface for displaying information about the user, said opening for attaching said information tag to an article of clothing worn the user.

13. An information tag in accordance with claim 12 wherein said first layer comprises a decal, said opening extends through said second layer, said second layer lower surface engraved to include information about the user.

14. An information tag in accordance with claim 12 further comprising a third layer attached to at least a portion of said second layer lower surface, such that said second layer between said first and third layers, said third layer comprising a sticker including a plurality of information about the user, said first layer resists discoloring when exposed to ultraviolet light.

15. An information tag in accordance with claim 14 wherein said opening extends through said second and third layers.

16. An information tag in accordance with claim 12 wherein at least one of said second layer upper surface and said second layer lower surface reflects light.

17. An information tag in accordance with claim 12 further comprising a plurality of openings extending through at least one of said first layer and said second layer.

18. An information tag in accordance with claim 12 wherein said first layer upper surface has a predetermined contour, said first layer resistant to indentations such that said first layer upper surface configured to return to the predetermined contour after being depressed.

19. An information tag in accordance with claim 12 wherein said opening configured to receive a shoelace therethrough for attaching said information tag to the user.

20. An information tag in accordance with claim 12 wherein said opening configured to receive a zipper pull therethrough for attaching said information tag to the user.

21. A tag configured to be attached to an item worn or carried by a user, said tag comprising a body comprising at least a first layer, a second layer, and an opening extending through at least one of said first layer and said second layer, said first layer attached to at least a portion of said second layer and comprising an upper surface and a substantially planar lower surface, said upper surface having a domed contour comprising a resilient material such that said upper surface returns to the domed contour after being depressed, said second layer comprising an upper surface and a lower surface, said second layer upper surface adjacent said first layer lower surface, said second layer lower surface for displaying plurality of information about the user, said opening for attaching said tag to the user, at least one of said second layer upper surface and said second layer lower surface reflects light.

22. A tag in accordance with claim 21 wherein said opening extends through said second layer, said second layer lower surface engraved to include information about the user.

23. A tag in accordance with claim 21 further comprising a sticker attached to at least a portion of said second layer lower surface, said decal including a plurality of information relevant to the user, said opening extending through said second layer.

24. A tag in accordance with claim 21 wherein said second layer upper and lower surfaces reflect light, said first layer resists discoloring when exposed to ultraviolet light.

25. A tag in accordance with claim 24 further comprising a plurality of openings extending through said second layer.

26. A tag in accordance with claim 21 wherein said opening configured to receive a shoelace therethrough for attaching said tag to the user.

27. A tag in accordance with claim 21 wherein said opening configured to receive a zipper pull therethrough for attaching said tag to the user.

28. A method for assembling an identification tag for providing information about a user, the identification tag including a plurality of layers including at least a first layer including a domed upper surface and a substantially planar lower surface, and a second layer including an upper surface and a lower surface, at least one of the plurality of layers for displaying information about the user, said method comprising the steps of:

attaching a first layer including a domed upper surface to a portion of the second layer such that the first layer lower surface is adjacent at least one of the second layer upper and lower surfaces; and forming an opening extending through at least one of the first and second layers.

29. A method in accordance with claim 28 wherein the first layer is a decal, said step of attaching the first layer to a portion of the second layer further comprises the step of attaching a decal including a domed upper surface to at least a portion of the second layer.

30. A method in accordance with claim 29 further comprising the step of engraving information about the user into the second layer lower surface.

31. A method in accordance with claim 29 further comprising the step of attaching a self-laminating sticker containing information about the user to the second layer lower surface.

32. A method in accordance with claim 29 wherein said step of forming an opening extending through at least one of the first and second layers further comprises the step of extending a plurality of openings through the second layer.

33. A method in accordance with claim 29 wherein at least one of the second layer upper and lower surfaces reflects light, said step of attaching the first layer to a portion of the second layer further comprising the step of attaching the first layer to a portion of the second layer such that the second layer reflects light.

34. A. method in accordance with claim 29 wherein said step of attaching the first layer to a portion of the second layer further comprises the step of attaching a first layer having a resilient upper surface including a domed contour to the second layer, such that the first layer returns to the domed contour after being depressed.

35. A method in accordance with claim 29 wherein said step of attaching the first layer to a portion of the second layer further comprises the step of attaching the first layer to the second layer such that the first layer resists discoloring when exposed to ultraviolet light.

* * * * *